United States Patent [19]
Fishman

[11] 3,710,444
[45] Jan. 16, 1973

[54] APPARATUS FOR CUTTING THIN-WALLED OBJECTS

[76] Inventor: Abraham Fishman, Sonnhaldenstrasse 6, 8032 Zurich, Switzerland

[22] Filed: Dec. 21, 1970

[21] Appl. No.: 100,057

[30] Foreign Application Priority Data

Dec. 29, 1969 Switzerland..................19511/69
July 22, 1970 Switzerland..................11088/70

[52] U.S. Cl. ..................................30/265, 30/294
[51] Int. Cl. ......................B26b 13/00, B26b 29/00
[58] Field of Search.........30/265, 286, 287, 289, 294

[56] References Cited

UNITED STATES PATENTS

| | | | |
|---|---|---|---|
| 2,660,787 | 12/1953 | Parker et al. | 30/265 |
| 1,098,671 | 6/1914 | Lundy | 30/265 X |
| 2,276,365 | 3/1942 | Angel | 30/265 |
| 1,913,951 | 6/1933 | Possnett | 30/265 |
| 1,607,010 | 11/1926 | Madsen | 30/265 |

FOREIGN PATENTS OR APPLICATIONS

157,077   12/1904   Germany..............................30/294

OTHER PUBLICATIONS

"Cutting Tool" W. K. French, IBM Technical Disclosure Bulletin, Vol. 2, No. 1, June. 1959, page 8.

*Primary Examiner*—Othell M. Simpson
*Attorney*—Werner W. Kleeman

[57] ABSTRACT

There is disclosed an apparatus for the cutting through of thin-walled objects with two cutting wheels mounted within a housing at shafts or axes spaced from one another and wherein such cutting wheels are rotatable independently of one another. The housing possesses an infeed gap or opening at which the cutting edges of both cutting wheels cooperate. According to important aspects of this invention the housing, defining a holder unit for the apparatus, encloses the cutting wheels, there being provided at the housing two guide slots which open at the infeed gap. Both cutting wheels are mounted to be freely rotatable and axially fixed with respect to one another.

5 Claims, 8 Drawing Figures

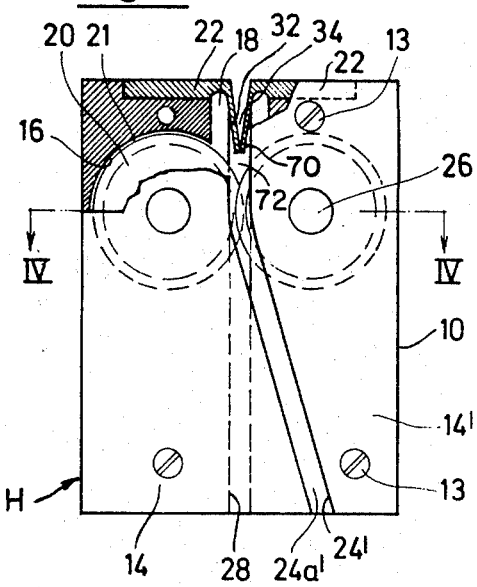
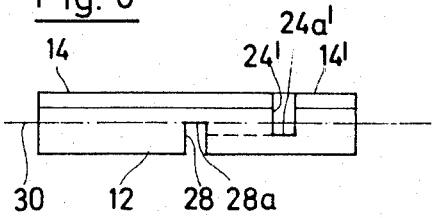
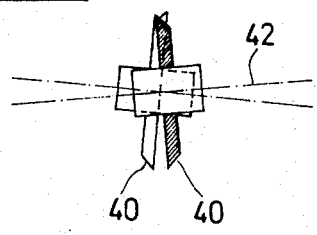
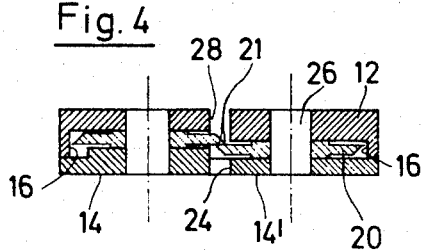
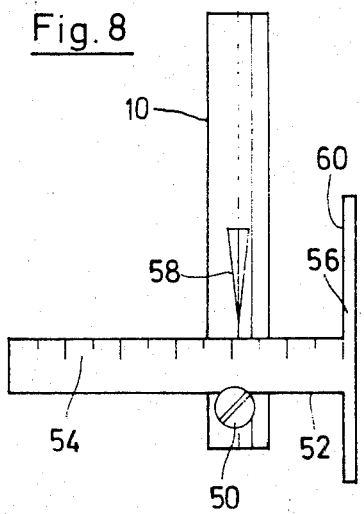
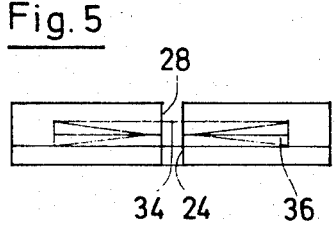
INVENTOR
ABRAHAM FISHMAN
BY WERNER W. KLEEMAN
ATTORNEY 3,710,444

APPARATUS FOR CUTTING THIN-WALLED OBJECTS

BACKGROUND OF THE INVENTION

The present invention relates to a new and improved apparatus for cutting through thin-walled objects, especially sheet or foil-like objects formed of paper, leather, cardboard, plastic, metal foils or the like.

Now different types of devices for the purpose of cutting thin-walled objects are already known to the art and which are of the type which work with two cooperating cutting wheels. In these prior art devices at least one or both of the cutting wheels is subjected from the outside to a rotational movement, e.g., to the action of a friction wheel rolling upon a support, or, however, friction wheels associated with the cutting wheels, these friction wheels rolling upon the web of material which is to be cut through, and therefore, generating a rotational movement at the cutting wheels themselves. A number of drawbacks are associated with such state-of-the-art equipment relying upon the action of friction wheels for driving the cutting wheels, and this invention therefore is concerned with equipment designed to overcome these drawbacks.

SUMMARY OF THE INVENTION

Accordingly, a primary objective of the present invention relates to an improved apparatus for cutting relatively thin-walled objects in a simple, reliable and positive manner.

Another and more specific object of the present invention relates to an improved construction of apparatus for the cutting of thin-walled objects wherein the cutting tools or knives are placed and maintained in rotation due to the relative movement prevailing between the material to be cut and the housing of the apparatus, so that no special drive mechanism need be provided for the cutting tools.

Still a further significant object of the present invention relates to an improved apparatus for cutting objects wherein the cutting tools are arranged within the housing so as to be fully protected, and the driving motion to which the cutting tools are subjected is generated solely through the action of relative movement between the material to be cut and the apparatus itself.

A still further object of the present invention relates to a unique design of cutting apparatus for objects, especially thin-walled objects, wherein the cutting apparatus is relatively simple in construction, devoid of any specific drive mechanism for the cutting implement, economical to manufacture, robust, not readily subject to breakdown, and requires very simple manipulation for use in cutting the objects.

Now, in order to implement these and still further objects of the invention, which will become more readily apparent as the description proceeds, the inventive apparatus for cutting relatively thin-walled objects by means of two cutting wheels which are mounted in a holder at shafts or axes spaced from one another and rotatable independently of one another, wherein the holder is equipped with an infeed gap, at which the cutting edges of both cutting wheels cooperate, is generally manifested by the features that the holder defines a housing enclosing the cutting wheels. Further, two guide slots extending through the housing open at the infeed gap, and both cutting wheels are mounted to be freely rotatable, and axially fixed relative to one another.

The inventive equipment is predicated upon the realization that the cutting knives or tools, defined by the cutting wheels can be maintained in rotation owing to the relative movement between the material to be cut and the housing of the equipment, so that there is not necessary any special drive means. At the surfaces of the cutting wheels forming the cutting edges the material to be cut generates sufficient frictional forces to impart a rotational movement to the cutting knives.

BRIEF DESCRIPTION OF THE DRAWINGS

The invention will be better understood and objects other than those set forth above, will become apparent when consideration is given to the following detailed description thereof. Such description makes reference to the annexed drawing wherein:

FIG. 3 illustrates a second embodiment of inventive apparatus, partially in plan view and partially in sectional view;

FIG. 4 is a cross-sectional view of the apparatus of FIG. 3, taken substantially along the line IV—IV thereof;

FIG. 5 is an end view of the apparatus of FIG. 3 as viewed from the top end thereof;

FIG. 6 is an end view of the rear face of the apparatus of FIG. 3 as viewed from the bottom end thereof;

FIG. 7 schematically illustrates an alternative arrangement of the cutting wheels, partially shown in sectional view; and FIG. 8 depicts a further embodiment of inventive apparatus in side view.

DETAILED DESCRIPTION OF THE PREFERRED EMBODIMENTS

Figure 1:
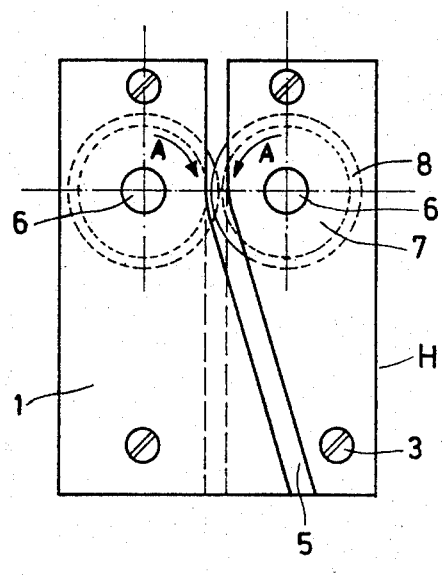
FIG. 1 is a plan view of one flat side of a first embodiment of inventive apparatus.
Figure 2:
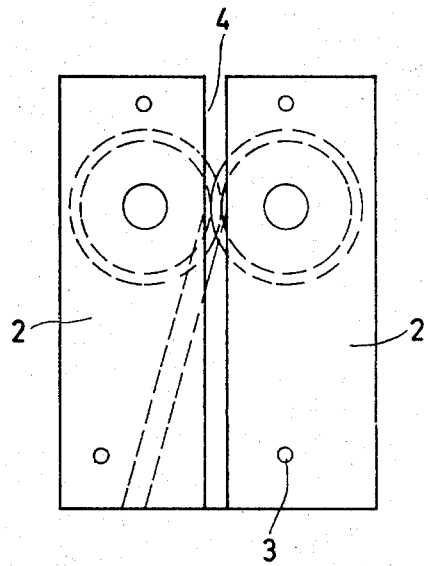
FIG. 2 is a plan view of the opposite flat side of the apparatus depicted in FIG. 1.

Describing now the drawings, the exemplary embodiment of inventive cutting apparatus as depicted in FIGS. 1 and 2 will be seen to comprise a substantially rectangular, handgrip-like holder H composed of, on one hand, the wall member 1 and, on the other hand, both of the elongate cover plates or rails 2 and 3. As best observed by referring to FIG. 2, the cover plates or rails 2 and 3 are fixedly connected with the wall member 1 through the agency of screws 3, or equivalent fastening expedients. These cover rails 2 are designed to possess such a width that between these cover plates or rails there is formed a guide slot 4 (FIG. 2) which extends in vertical direction. Furthermore, as best observed by referring to FIG. 1, the wall member 1 is provided with an angled guide slot 5, the purpose of which will be described more fully hereinafter.

The holder H, defining the housing of the equipment, is pierced at its upper end by the shafts or bolt members 6, each of the latter having a rotatable arranged substantially circular plate-shaped cutting element 7. These cutting elements 7 are equipped at their peripheral area with a beveled portion 8 forming sharp cutting edges. The cutting elements 7 are dimensioned such and arranged in relationship to one another such that, as best seen by referring to the drawings, the portion of the cutting edges 8 of both cutting elements 7 which are disposed within the guide slot 4 engage over one another.

Having now had the benefit of the general description of the initial embodiment of the present invention, its mode of operation will now be considered.

Let it be assumed that it is intended to cut, e.g., a sheet of paper, by means of the described cutting device. Hence the relevant sheet of paper may be grasped with the left hand and held, e.g., at chest height, such that its flat side extends in horizontal direction. Thereafter, the lower portion of the holder H is grasped with the right hand and the holder is then turned through an angle of about 90° from the position thereof as shown in FIG. 1. The thus turned holder H is open at the top towards the sheet of paper to be cut. Owing to the resistance which this sheet of paper exerts against the cutting elements 7 these cutting elements are therefore rotated in the direction of the arrows A of FIG. 1 exerting a cutting action upon the sheet of paper for such length of time as there is carried out a feed movement at the holder H.

As is best understood by referring to FIG. 1, during such time as the sheet of paper is cut the cut-off piece thereof is guided at an inclination through the guide slot 5 and deflected towards the outside of the equipment.

The arrangement of equipment depicted in FIG. 3 – 6 inclusive is similar to that of FIG. 1 and shows greater details of the internal structure. By referring now to these Figures it will be seen that the embodiment of cutting device or apparatus depicted therein comprises a holder H which defines the apparatus housing 10, and this housing 10, just as was the case with the preceeding embodiment, is composed of the holder wall or wall portion 12 and two cover members 14, 14'. The cover portions 14 and 14' cover suitable recesses 16 and 18 formed at the holder portion of wall 12. Furthermore, the recesses 16 serve to receive the cutting elements, the cutting wheels 20, and the recesses 18 have connected thereat the centering members 22 defining guide elements. Additionally, it will be understood that the cover portions 14, 14' limit therebetween a portion of an angled guide slot means 24, 24', and these cover portions 14, 14' are detachably secured to the holder wall 12 through the agency of screws or equivalent fastening devices.

Continuing, it will be seen that the cutting wheels 20 are arranged for rotation upon shafts or bolts 26 disposed in parallelism to one another. These bolts 26 are supported at the holder wall 12 and also at the cover members 14 and 14'. The arrangement of the cutting wheels 20 within the recesses 16 is chosen such that there is prevented any axial play of such cutting wheels, as best recognized e.g., by referring to FIG. 4. There it can be seen that the cutting wheels 20 bear directly, without play, at the corresponding inner surfaces of the components 12 and 14, 14'.

Just as was the case with the embodiment of FIGS. 1 and 2, here also the inventive cutting apparatus has the cutting edges 21 of the cutting wheels 20 overlapping at the region of the guide slot means 24 and at the region of a linear guide slot 28 provided at the other side of such guide slot 24 at the holder wall 12, and especially at that location of the linear guide slot 28 where, as shown in the exemplary embodiment of FIG. 3, the guide slot means 24 extends up to linear guide slot 28.

Thus, it is clearly seen that the cutting wheels 20 have cutting edges 21 which cooperate with one another to define an effective cutting zone for the cutting of thin walled objects. Moreover, as shown in the plane view of FIG. 3, the cutting edges 21 of the cutting wheels 20 define a generally V-shaped area or formation designated by reference numeral 72.

Furthermore, it is to be understood that the guide slot 28, at that portion thereof which is not common with the inclined guide slot 24, possesses a depth which corresponds to at least one-half of the thickness or height of the holder unit or housing 10. The base 28a of the slot 28 is therefore located at the central plane 30 (cf. FIG. 6) of the housing 10, the cutting edges 21 of the cutting wheels 20 being effective at such central plane 30.

The guide slot 24 possesses a partial slot portion 24' which is angled with respect to the linear guide slot 28, slot portion 24' opening at the end of the housing 10 opposite the cutting wheels 20. The guide slot 24', formed as a groove, penetrates into the holder wall 12 and is so deep that its base 24a is disposed at the other side of the central plane 30 of the housing 10, as best observed by referring to FIG. 6. Since the central plane 30 corresponds to the cutting plane of the cutting edges 21, the guide slots 24 and 28 permit free throughpassage of the cut edges of the material to be cut, which cut edges are formed during the cutting operation. In order to cut strips possessing linear boundary edges, the groove 28 and specifically the base 28a can be used as guide surface means which can be moved along the already formed cut or cutting edges of the material.

Both of the centering members 22, which are mounted at the recesses 18, and which are arranged symmetrically with respect to one another, will be seen to possess resilient flaps or guide elements 32 at the end portions thereof facing one another. These flaps include a lower portion 70 (FIG. 3) which extends into the generally V-shaped formation 72 and terminates at a location immediately preceding the effective cutting zone of the cutting edges 21. By this arrangement a shortened distance to the cutting zone is provided which greatly minimizes the warping or buckling tendencies of the thin material being fed to the cutting wheels 21. These flaps 32 form and limit therebetween an infeed or inlet gap 34. During insertion of the material to be cut, the inlet or infeed gap 34 widens in accordance with the thickness of the material and, thus, guides the material to be cut towards the cutting wheels 20.

Now, as best observed by referring to FIG. 5, the centering elements or members 22 carry arrow-like markings 36 at their end surfaces, and which permit recognition of the position of the cutting plane 30 from the outside. It is therefore possible to render the cutting apparatus with its cutting wheels effective at a certain location of the material to be cut.

By referring to the schematic illustration of FIG. 7, it will be recognized that it is also possible to arrange the cutting elements or knives 40 at axes 42 which are not parallel to one another. For instance, it is possible to arrange the axes 42 in planes which are parallel to one another, whereby, however, these axes when projected on these planes enclose an angle with respect to one another.

FIG. 8 illustrates the possibility of detachably securing an auxiliary device 52 to the housing 10 of the cutting apparatus by means of a clamping screw 50 or other suitable attachment member. This auxiliary device 52 embodies a measuring ruler 54 and a guide rail 56 secured perpendicular to the measuring ruler 54. A marker arrow 58 applied to a side surface of the apparatus indicates the cutting plane 30. The width of the guide rail 56 is chosen such that it extends past the previously considered guide slot 24 and it forms at its face or side confronting the cutting apparatus a guide surface 60 against which there can bear an already present edge of the material to be cut in order to be able to cut out of such material strips of a predetermined width corresponding to the size indicated by the arrow 58.

During use of the inventive apparatus it was found that if the cutting elements or knives are mounted without there being present any excessive amount of friction, the frictional forces generated at the cutting wheels by the material to be cut itself is completely sufficient in order to maintain in rotational movement these cutting wheels during relative movement between the cutting apparatus and the material to be cut, which movement of the cutting wheels is necessary for performing a clean cutting operation. On the other hand, the material to be cut even with the cutting wheels stationary can be readily notched or provided with a starting cut in order to thus place the cutting wheels into rotation.

An embodiment of the cutting apparatus of the invention is also conceivable according to which such apparatus can be clamped into a clamping mechanism threadably connected or otherwise attached to a table plate, whereby then the material to be cut is moved with respect to the cutting elements 7 or 20, respectively.

Owing to the flat configuration of the housing of the various forms of inventive cutting apparatus, which not only allows the apparatus to be conveniently held and used, additionally this form of the housing, which incidentally can be fabricated from metal or plastic, by way of example, is also extremely advantageous to permit such flat housing structure to be used as a carrier for advertisements. Accordingly, the cutting apparatus of the invention can also be utilized as an advertisement novelty or giveaway article.

The described cutting apparatus, apart from the advantages noted heretofore, possesses the additional advantageous features that the construction itself is relatively simple, and therefore, can be inexpensively manufactured, it is exceptionally suitable for craftsman or repair work, yet it can be, however, also advantageously employed in offices as well as in the household.

A further notable advantage of the apparatus of this invention resides in the fact that the cutting elements themselves are completely enclosed. Consequently, there is obviated the danger that the user will injure himself, and furthermore, the cutting elements are completely protected against damage.

While there is shown and described present preferred embodiments of the invention, it is to be distinctly understood that the invention is not limited thereto but may be otherwise variously embodied and practiced within the scope of the following claims. Accordingly,

What is claimed is:

1. An apparatus for the cutting of thin-walled objects comprising housing means, a pair of cutting wheels including cutting edges enclosed within said housing means, said cutting edges cooperating with one another to define an effective cutting zone for the cutting of the objects, means incorporating a pair of shaft members for mounting said cutting wheels in said housing means so as to be freely rotatable and axially non-displaceable with respect to one another, said housing means being provided with means defining an infeed slot for the object to be cut, said cutting edges of said cutting wheels having said effective cutting zone disposed at the region of said infeed slot, said cutting edges of said cutting wheels defining a generally V-shaped formation adjacent said cutting zone when viewed in plan when said infeed slot is disposed vertically, centering means provided for said infeed slot, said centering means defining guide elements extending into said generally V-shaped formation and terminating immediately preceding the effective cutting zone of said cutting edges for guiding the objects to be cut to the region of said cutting zone, said housing means further including means defining a pair of guide slot means opening into said infeed slot, said pair of guide slot means being mutually coextensive over at least a portion of their length at the region of said infeed slot, one of said guide slot means extending substantially linearly and the other of said guide slot means being angled away from said linearly extending guide slot means following the mutually coextensive length portions of said pair of guide slot means.

2. The apparatus as defined in claim 1, wherein said guide elements comprise a pair of resilient flexible flap members which are symmetrically arranged with respect to said infeed slot.

3. The apparatus as defined in claim 1, wherein both of said guide slot means extend between opposite ends of said housing means.

4. The apparatus as defined in claim 1, wherein the effective cutting zone of the cutting edges of said cutting wheels is disposed at a substantially central plane of said housing means, and wherein the base of at least one of the guide slot means is further removed from the associated face of the housing means than said central plane of said housing means.

5. The apparatus as defined in claim 1, wherein said housing means possesses a configuration rendering it easily grippable by the hand of a user.

* * * * *